Jan. 16, 1923.
F. M. SMITH.
HACK SAW.
FILED MAY 9, 1922.
1,442,740
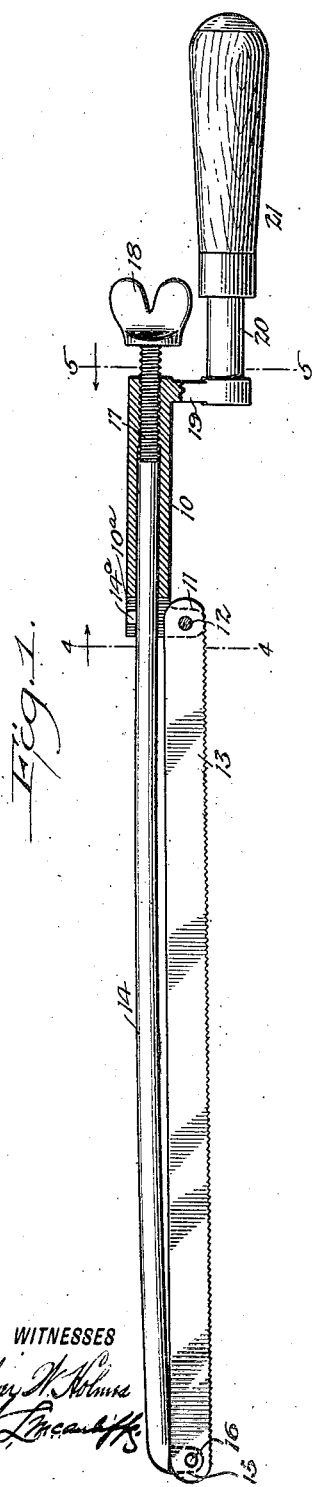
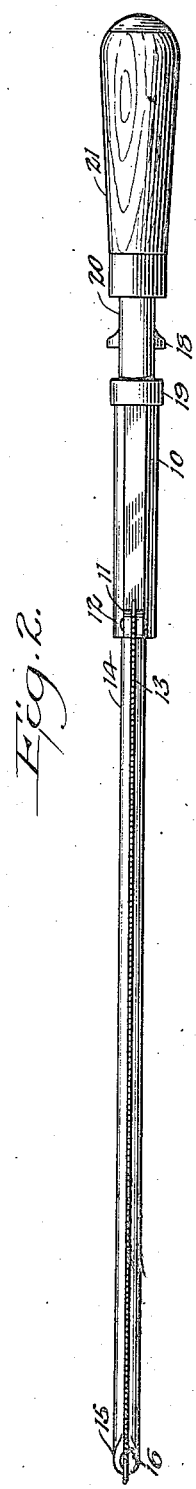
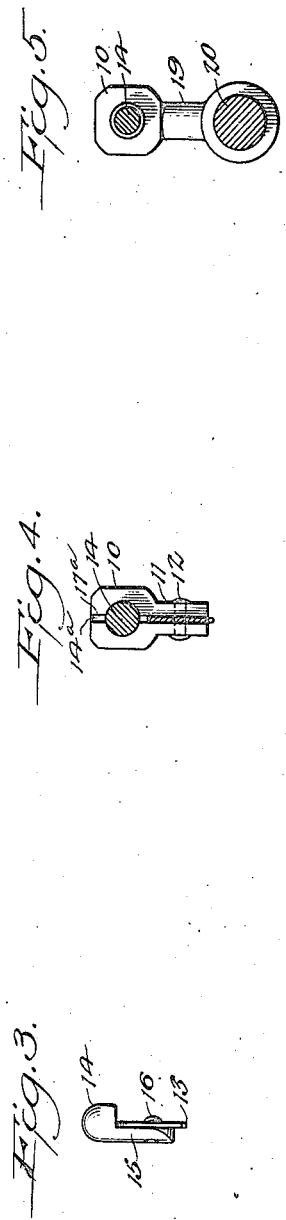
WITNESSES
INVENTOR
Frank M. Smith
BY
ATTORNEYS Patented Jan. 16, 1923.

1,442,740

UNITED STATES PATENT OFFICE.

FRANK MASON SMITH, OF BRIDGEWATER, SOUTH DAKOTA.

HACK SAW.

Application filed May 9, 1922. Serial No. 559,565.

*To all whom it may concern:*

Be it known that I, FRANK M. SMITH, a citizen of the United States, and a resident of Bridgewater, in the county of McCook and State of South Dakota, have invented a new and Improved Hack Saw, of which the following is a description.

My invention relates to a hack saw and particularly to a hack saw having a novel means for mounting and tensioning the saw blade.

The general object of the invention is to provide a hack saw so formed and arranged as to be available for sawing in places under conditions affording only the most limited clearance for the movements of the saw.

A more specific object of the invention is to provide a hack saw for the indicated purpose reflecting practical considerations looking to the facility with which the parts may be produced, assembled, and adjusted as well as obtaining simplicity and durability of construction.

The nature of the invention and its distinguishing features and advantages will more clearly appear as the description proceeds.

Reference is to be had to the accompanying drawings forming a part of this specification, it being understood that the drawings are merely illustrative of one example of the invention.

Figure 1 is a partly sectional side elevation of a hack saw embodying my invention;

Figure 2 is an edge view looking in the direction of the toothed edge of the blade;

Figure 3 is a front end view of the saw;

Figures 4 and 5 are transverse sections respectively on the lines 4—4 and 5—5, Figure 1.

In carrying out my invention in practice in accordance with the illustrated example, a tubular body 10 is provided having at the forward end thereof depending lugs 11 between which the rear end of a saw blade 13 is accommodated, said lugs having a removable pin 12 for holding said rear end of the blade. The tubular body 10 receives the rear end of an elongated extensible rod 14, the downturned front end 15 of which presents a rabbet to receive the forward end of the saw blade 13, said downturned end 15 having a lateral stud 16 onto which the saw blade is placed.

The arrangement is such that the rod 14 constitutes the back of the saw and extends along the back edge, said blade lying comparatively close to the said rod and indeed advantageously lying with its back edge directly against the forward portion of said rod.

A threaded shank 17 engages in the threaded rear end of the bore of the tubular body 10 and is adapted to be turned backward or forward by a rigid finger-hold 18 or other turning head on the rear end of said shank. The front end of the shank 17 is adapted to bear against the rear end of the rod 14, for advancing said rod and thereby tensioning the saw blade 13. The turning back of the shank 17 permits of the rod 14 to move rearwardly slightly for relieving the tension on the saw blade in the frame for the removal of the blade or for disposing the parts for the emplacement of a blade.

The rod 14 is prevented from turning by reason of a lug 14$^a$ thereon which has play in a slot 10$^a$ in the front end of the body 10 in response to the slight forward and backward movement of said rod 14.

The rear end of the body 10 has a member 19 at right angles thereto or approximately so on that side of the body receiving the saw blade 13 and from said member 19 extends rigidly the shank 20 of a handle 21.

I would state in conclusion that while the illustrated example constitutes a practical embodiment of my invention, I do not limit myself strictly to the exact details herein illustrated, since, manifestly, the same can be considerably varied without departure from the spirit of the invention as defined in the appended claims.

Having thus described my invention, I claim:—

1. A hack saw including a tubular body having means at its front end to engage the rear end of a saw blade, a rod telescoping in said body adapted to be disposed along the back of the saw and adjacent thereto, the front end of said rod having means to engage the saw at the forward end, and means associated with said body adapted to bear against the rear end of the rod for moving the same forwardly for tensioning the saw blade.

2. A hack saw including a tubular body having means at its front end to engage the rear end of a saw blade, a rod telescoping in said body adapted to be disposed along the back of the saw and adjacent thereto, the front end of said rod having means to engage the saw at the forward end, and a threaded shank engaged in the rear end of said body and adapted to bear at its forward end against the rear end of said rod.

3. A hack saw including a tubular body having means at its front end to engage the rear end of a saw blade, a rod telescoping in said body adapted to be disposed along the back of the saw and adjacent thereto, the front end of said rod having means to engage the saw at the forward end and a turnable threaded shank engaging in the rear end of said body and adapted to bear against the forward end of said rod, and a lug on said rod, said body having a slot in which said lug may have play longitudinally, said lug serving to prevent turning of the rod.

4. A hack saw including a tubular body having a downwardly extending lug at its front end to engage the rear end of a saw blade, a rod telescoping in said body adapted to be disposed along the back of the saw and adjacent thereto, the front end of said rod having means to engage the saw at the forward end, a threaded shank engaging in the rear end of said body and having means on the rear end of the shank for turning the same, the forward end of said shank adapted to bear against the rear end of said rod, a lateral member on said body at the rear end, and a handle rigid with said member.

FRANK MASON SMITH.